(12) United States Patent
Kamara

(10) Patent No.: US 9,158,925 B2
(45) Date of Patent: Oct. 13, 2015

(54) SERVER-AIDED PRIVATE SET INTERSECTION (PSI) WITH DATA TRANSFER

(71) Applicant: Microsoft Corporation, Redmond, WA (US)

(72) Inventor: Seny Kamara, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 14/091,810

(22) Filed: Nov. 27, 2013

(65) Prior Publication Data

US 2015/0149763 A1    May 28, 2015

(51) Int. Cl.
*H04L 29/06* (2006.01)
*G06F 21/60* (2013.01)
*H04L 9/08* (2006.01)

(52) U.S. Cl.
CPC .............. *G06F 21/60* (2013.01); *H04L 9/083* (2013.01); *H04L 9/085* (2013.01); *H04L 9/0869* (2013.01); *H04L 63/0428* (2013.01)

(58) Field of Classification Search
CPC ... H04L 9/321; G06F 21/44; G06F 17/30424; G06F 17/30386; G06F 17/00
See application file for complete search history.

(56) References Cited

U.S. PATENT DOCUMENTS

| 8,140,502 B2 | 3/2012 | Francis et al. |
| 8,271,796 B2 | 9/2012 | Diamond |
| 2013/0010950 A1 | 1/2013 | Kerschbaum |
| 2013/0227273 A1 | 8/2013 | Di Crescenzo |
| 2013/0227274 A1* | 8/2013 | Di Crescenzo ............... 713/153 |
| 2013/0246802 A1* | 9/2013 | Kerschbaum ................. 713/189 |

OTHER PUBLICATIONS

Aiello, B., Y, Ishai, O. Reingold, Priced oblivious transfer: How to sell digital goods, Proc. of the Int'l Conf. on the Theory and Application of Cryptographic Techniques: Advances in Cryptology, May 14, 2001, vol. 2045, pp. 119-135.

Asharov, G., A. Jain, A. López-Alt, E. Tromer, V. Vaikuntanathan, D. Wichs, Multiparty computation with low communication, computation and interaction via threshold FHE, Proc. of the 31st Annual Int'l Conf. on Theory and Applications of Cryptographic Techniques, EUROCRYPT 2012, Apr. 15-19, 2012, pp. 483-501.

(Continued)

*Primary Examiner* — Izunna Okeke
(74) *Attorney, Agent, or Firm* — Julie Kane Akhter; Danielle Johnston-Holmes; Micky Minhas

(57) ABSTRACT

Existing private set intersection (PSI) protocol allows two parties to find intersection of their sets, but restricts learning any other information about each other's set except for its size. In general, the server-aided private set intersection with data transfer technique described herein provides a server-aided private set intersection (PSI) protocol that supports data transfers. The technique pertains to a method for providing a server-aided private set intersection protocol which allows two parties to transfer some of the information about their elements via an untrusted third party. The protocol involves (a) parties applying a shared pseudo-random permutation to each of their sets to create labels of the elements of the set, (b) sending the labels to the third party and (c) the third party performing data transfer between the two parties along with computation of intersection of sets received using a multi-share key.

20 Claims, 9 Drawing Sheets

(56) References Cited

OTHER PUBLICATIONS

Aumann, Y., Y. Lindell, Security against covert adversaries: Efficient protocols for realistic adversaries, Proc. of the 4th Theory of Cryptography Conf., Theory of Cryptography, TCC 2007, Feb. 21-24, 2007, pp. 137-156, Amsterdam, The Netherlands.
Baldi, P., R. Baronio, E. D. Cristofaro, P. Gasti, G. Tsudik, Countering GATTACA: Efficient and secure testing of fully-sequenced human genomes, Proc. of 18th ACM Conf. on Comp. and Communications Security, CSC'11, Oct. 11, 2011, pp. 691-702.
Barak, B., O. Goldreich, Universal arguments and their applications, Proc. of the 17th IEEE Annual Conf. on Computational Complexity, May 21, 2002, pp. 194-204.
Ben-David, et al., FairplayMP—A System for Secure Multi-Party Computation, Proc. of 15th ACM Conf. on Comp. and Communications Security, Oct. 27, 2008, 10 pages.
Bogdanov, D., S. Laur, J. Willemson, Sharemind: A framework for fast privacy-preserving computations, Proc. of the 13th European Symposium on Research in Compute Security: Computer Security, Oct. 6, 2008, vol. 5283, pp. 192-206.
Bogetoft, P., D. L. Christensen, I. Damgård, M. Geisler, T. Jakobsen, M. Krøigaard, J. D. Nielsen, J. B. Nielsen, K. Nielsen, J. Pagter, M. Schwartzbach, T. Toft, Secure multiparty computation goes live, Proc. of Book Financial Cryptography and Data Security, Feb. 23, 2009, vol. 5628, pp. 325-343.
Boudot, F., B. Schoenmakers, J. Traoré, A fair and efficient solution to the socialist millionaires' problem, Proc. of Discrete Applied Mathematics, vol. 111, No. 1-2, Jul. 1, 2001, pp. 23-36.
Camenisch, J., G. M. Zaverucha, Private intersection of certified sets, Financial Cryptography and Data Security Lecture Notes in Computer Science, Feb. 23-26, 2009, vol. 5628, pp. 108-127.
Canetti, Ran, Universally composable security: A new paradigm for cryptographic protocols, Proc. of the 42nd IEEE Symposium on Foundations of Computer Science, FOCS 2001, Oct. 2001, pp. 136-145.
Cleve, Richard, Limits on the security of coin flips when half the processors are faulty, Proc. Of the Eighteenth Annual ACM Symposium on Theory of Computing, May 28, 1986, pp. 364-369.
Cristofaro, E. D., Y. Lu, G. Tsudik, Efficient techniques for privacy-preserving sharing of sensitive information, Proc. o the 4th Int'l Conf. on Trust and Trustworty Computing, TRUST 2011, Jun. 22-24, 2011, pp. 239-253, Pittsburgh, PA, USA.
Cristofaro, E. D., J. Kim, G. Tsudik, Linear-complexity private set intersection protocols secure in malicious model, Proc. of the 16th Int'l Conf. on the Theory and Application of Cryptology and Information Security, ASIACRYPT 2010, Dec. 5-9, 2010, pp. 213-231, vol. 6477.
Cristofaro, E. D., G. Tsudik, Practical private set intersection protocols with linear complexity, 14th Int'l Conf. Financial Cryptography and Data Security, FC 2010, Jan. 25-28, 2010, pp. 143-159, Tenerife, Canary Islands.
Dachman-Soled, D., T. Malkin, M. Raykova, M. Yung, Efficient robust private set intersection, Proc. of the 7th Int'l Conf. on Applied Cryptography and Network Security, Jun. 2, 2009, pp. 125-142.
Dai, W., Crypto++® Library 5.6.2, Feb. 20, 2013, 4 pages.
Damgård, I., M. Geisler, M. Krøigaard, J. B. Nielsen, Asynchronous multiparty computation: Theory and implementation, 12th Int'l Conf. on Practice and Theory in Public Key Cryptography, Mar. 18-20, 2009, pp. 160-179, Irvine, CA, USA.
Damgård, I., Y. Ishai, Constant-round multiparty computation using a black-box pseudorandom generator, Proc. of the 25th Annual Int'l Cryptology Conf., CRYPTO 2005, Aug. 10, 2005, pp. 378-394, Santa Barbara, California, USA.
Damgård, I., Y. Ishai, M. Krøigaard, J. B. Nielsen, A. Smith, Scalable multiparty computation with nearly optimal work and resilience, Proc. of the 28th Annual Int'l Cryptology Conf., CRYPTO 2008, Aug. 2008, pp. 241-261, Santa Barbara, CA, USA.
Dong, C., L. Chen, J. Camenisch, G. Russello, Fair private set intersection with a semi-trusted arbiter, Proc. of the 27th Annual IFIP WG 11.3 Conf., Data and Applications Security and Privacy XXVII, Jul. 2013, pp. 128-144, Newark. NJ, USA.
Ejgenberg, Y., M. Farbstein, M. Levy, Y. Lindell, SCAPI: The secure computation application programming interface, Proc. of IACR Cryptology ePrint Archive 2012, Aug. 21, 2013, pp. 17.
Fagin, R., M. Naor, P. Winkler, Comparing information without leaking it, Commun. ACM, May 1996, pp. 77-85, vol. 39, No. 5.
Feige, U., J. Kilian, M. Naor, A minimal model for secure computation (extended abstract), Proc. of the Twenty-Sixth Annual ACM Symposium on Theory of Computing, STOC 1994, May 1994, pp. 554-563, Montréal, Québec, Canada.
Fischlin, M., B. Pinkas, A.-R. Sadeghi, T. Schneider, I. Visconti, Secure set intersection with untrusted hardware tokens, Topics in Cryptology-CT-RSA 2011—The Cryptographers' Track at the RSA Conf. 2011, Ct-RSA 2011, Feb. 14-18, 2011, pp. 1-16, San Francisco, CA, USA.
Freedman, M. J., A. Nicolosi, Efficient private techniques for verifying social proximity, 6th Int'l Workshop on Peer-To-Peer Systems, IPTPS 2007, Feb. 26-27, 2007, Bellevue, WA, USA.
Garay, J., P. Mackenzie, M. Prabhakaran, K. Yang, Resource fairness and composability of cryptographic protocols, Proc. of the Third Theory of Cryptography Conf., TCC 2006, Lecture Notes in Computer Science, Mar. 4-7, 2006, pp. 404-428, vol. 3876, New York, NY, USA.
Gelles, R., R. Ostrovsky, K. Winoto, Multiparty proximity testing with dishonest majority from equality testing, 39th Int'l Colloquium on Automata, Languages and Programming, ICALP 2012, Part II, LNCS 7392, Jul. 2012, pp. 537-548.
Gentry, C., Fully homomorphic encryption using ideal lattices, Proc. of the 41st Annual ACM Symposium on Theory of Computing, STOC '09, pp. 169-178, ACM New York, NY, USA.
Gordon, S. D., C. Hazay, J. Katz, Y. Lindell, Complete fairness in secure two-party computation, J. ACM, Dec. 2011, vol. 58, No. 6, Article 24, pp. 37.
Gordon, S. D., J. Katz, Partial fairness in secure two-party computation, Proc. of the 29th Annual Int'l Conf. on the Theory and Applications of Cryptographic Techniques, EUROCRYPT 2010, May 30-Jun. 3, 2010, pp. 157-176.
Hazay, C., Y. Lindell, Constructions of truly practical secure protocols using standard smartcards, Proc. of the 2008 ACM Conf. on Comp. and Comm. Security, CCS 2008, Oct. 27-31, 2008, pp. 491-500, Alexandria, Virginia, USA.
Hazay, C., Y. Lindell, Efficient protocols for set intersection and pattern matching with security against malicious and covert adversaries, Proc. of the 5th Conf. on Theory of Cryptography, Sep. 14, 2008, pp. 422-456.
Hazay, C., K. Nissim, Efficient set operations in the presence of malicious adversaries. Proc. of the 13th Int'l Conf. on Practice and Theory in Public Key Cryptography, May 2010, pp. 312-331, Paris, France.
Henecka, W., S. Kögl, A.-R. Sadeghi, T. Schneider, I. Wehrenberg, TASTY: Tool for automating secure two-party computations, Proc. of the 17th ACM Conf. on Comp. and Comm. Security, Oct. 4, 2010, pp. 451-462.
Hide, et al., "Sparsehash", Retrieved on: Oct. 9, 2013, Available at: https://code.google.com/p/sparsehash/, pp. 3.
Huang, Y., D. Evans, J. Katz, L. Malka, Faster secure two-party computation using garbled circuits, Proc. of the 20th USENIX Security Symposium, Aug. 8-12, 2011, San Francisco, CA, USA.
Huang, Y., D. Evans, J. Katz, Private set intersection: Are garbled circuits better than custom protocols?, 19th Annual Network and Distributed System Security Symposium, NDSS 2012, Feb. 5-8, 2012, pp. 15, San Diego, California, USA.
Kamara, S., P. Mohassel, M. Raykova, Outsourcing multi-party computation, Proc. of the Int'l Association for Cryptologic Research, IACR Cryptology ePrint Archive, May 2011, pp. 1-41, vol. 2011.
Kamara, S., P. Mohassel, B. Riva, Salus: A system for server-aided secure function evaluation, Proc. of the 2012 ACM Conf. on Computer and Communications Security, CCS '12, Oct. 2012, pp. 797-808, ACM New York, NY, USA.
Kamara, S., P. Mohassel, M. Raykova, S. Sadeghian, Scaling private set intersection to billion-element sets, TechReport MSR-TR-2013-63, Jun. 2013, pp. 14.

(56) References Cited

OTHER PUBLICATIONS

Katz, J., R. Ostrovsky, A. Smith, Round efficiency of multi-party computation with a dishonest majority, Eurocrypt 2003, May 2003, pp. 578-595.

Kerschbaum, F., Outsourced private set intersection using homomorphic encryption, 7th ACM Symposium on Information, Computer and Communications Security, ASIACCS 2012, May 2-4, 2012, pp. 85-86, Seoul, Korea.

Knuth, D. E., The art of computer programming, Nov. 1997, pp. 140, Available at: http://profs.sci.univr.it/~manca/storia-informatica/mmix.pdf.

Lindell, Y., Parallel coin-tossing and constant-round secure two-party computation, J. Cryptology, Jun. 2003, pp. 143-184, vol. 16, No. 3.

Lipmaa, H., Verifiable homomorphic oblivious transfer and private equality test, Proc. of the 9th Int'l Conf. on the Theory and Application of Cryptology and Information Security, Advances in Cryptology—ASIACRYPT 2003, Nov. 30-Dec. 4, 2003, pp. 416-433, Taipei, Taiwan.

Malka, L., VMCrypt: Modular software architecture for scalable secure computation, Proc. of the 18th ACM Conf. on Computer and Communications Security, CCS 2011, Oct. 17-21, 2011, pp. 715-724, Chicago, Illinois, USA.

Malkhi, D., N. Nisan, B. Pinkas, Y. Sella, Fairplay—A secure two-party computation system, Proc. of the 13th Conf. on USENIX Security Symposium, SSYM'04, Feb. 2004, vol. 13, pp. 287-302, Berkeley, CA, USA.

Nagaraja, S., P. Mittal, C.-Y. Hong, M. Caesar, N. Borisov, Botgrep: Finding P2P bots with structured graph analysis, Proc. of the 19th USENIX Conf. on Security, Aug. 11, 2010, 16 pages.

Narayanan, A., N. Thiaharajan, M. Lakhani, M. Hamburg, D. Boneh, Location privacy via private proximity testing, Proc. of the Network and Distributed System Security Symposium, NDSS 2011, Feb. 2011, San Diego, California, USA.

Pickett, J., MSOpenTech / redis, retrieved from https://github.com/MSOIpenTech/redis, Oct. 9, 2013, pp. 1-3.

Pinkas, B., Fair secure two-party computation, Proceedings Advances in Cryptology—Eurocrypt '2003, LNCS 2656, May 2003, pp. 87-105, Springer-Verlag.

Saldamli, G., R. Chow, H. Jin, B. P. Knijnenburg, Private proximity testing with an untrusted server, Sixth ACM Conf. on Security and Privacy in Wireless and Mobile Networks, WISEC'13, Apr. 17-19, 2013, pp. 113-118, Budapest, Hungary.

Sanfilippo, S., P. Noordhuis, Hiredis-win32, retrieved from https://github.com/texnician/hiredis-win32, Oct. 9, 2013, pp. 7.

Stefanov, E., E. Shi, D. Song, Policy-enhanced private set intersection: Sharing information while enforcing privacy policies, Proc. of the 15th Int'l Conf. on Practice and Theory in Public Key Cryptography, May 21-23, 2012, pp. 413-430, Darmstadt, Germany.

Yao, A. C.-C., How to generate and exchange secrets (Extended Abstract), 27th Annual Symposium on Foundations of Computer Science, FOCS 1986, Oct. 1986, pp. 162-167, Toronto, Canada.

Yao, A. C.-C., Protocols for secure computations (Extended Abstract), 23rd Annual Symposium on Foundations of Computer Science, FOCS 1982, Nov. 1982, pp. 160-164, Chicago, Illinois, USA.

"International Search Report and Written Opinion Issued in PCT Application No. PCT/US2014/066023", Mailed Date: Mar. 20, 2015, 12 Pages. (MS# 340138.02).

Neugebauer, et al., "Design and Implementation of Privacy-Preserving Reconciliation Protocols", In Proceedings of 16th International Conference on Extending Database Technology, Mar. 18, 2013, pp. 121-130.

\* cited by examiner

SERVER-AIDED PRIVATE SET INTERSECTION (PSI) WITH DATA TRANSFER

BACKGROUND

Private set intersection (PSI) allows two parties to find the intersection of their sets without revealing the data elements of their sets to each other. PSI has numerous real-world applications including privacy-preserving data mining, location-based services and genomic computations. More specifically, a PSI protocol allows two parties $P_1$ and $P_2$ to find the intersection of two sets $S_1$ and $S_2$ from some universe U without having to disclose the sets to each other. In other words, with a PSI protocol $P_1$ and $P_2$ can find the intersection $I = S_1 \cap S_2$ of their sets without learning any information about the other party's set beyond its size.

With a server-aided PSI protocol, the two parties $P_1$ and $P_2$ can, in addition, outsource some of their computations to an untrusted server—instantiated, for example, in the cloud. Server-aided PSI protocols are more efficient for clients than traditional PSI protocols by several orders of magnitude.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The server-aided private set intersection with data transfer technique described herein provides a server-aided private set intersection (PSI) protocol that supports data transfers. The PSI protocol of the technique can operate in a server-aided setting, where the parties have access to an untrusted server that makes its computational resources available as a service. In one embodiment, the protocol requires only a linear number of block-cipher invocations (a pseudo random permutation), and the execution of a standard/plaintext set intersection algorithm.

The technique allows two clients to transfer information about some of their data elements over a network via a server. To this end, in one embodiment of the technique, a first client generates for each element in the first client's set $S_1$: a label for the element, an identifier for the element, and an encrypted form for the data associated with the element that was encrypted using a two-share secret key. The first client sends to a server for each element in set $S_1$, the label for each element, the identifier for each element, and the first share of the two-share secret key. The first client also sends to the second client, for each element in the set $S_1$, the identifier for each element, the encrypted data associated with each element and the second share of the two-share secret key. Similar to the first client, the second client sends labels generated for the elements of the second client's set $S_2$ to the server. The server computes the intersection of the labels of the received sets, and sends to the second party, for each element in the intersection, the label, the identifier for the element and the first share of the two-share secret key. The second client can then decrypt the data associated with each element in the intersection of the sets using the labels, the identifiers and the first and second shares of the two-share secret key. By virtue of this technique, no party to the transaction, neither the clients nor the server, discover any of the clients' data that they do not wish to reveal.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
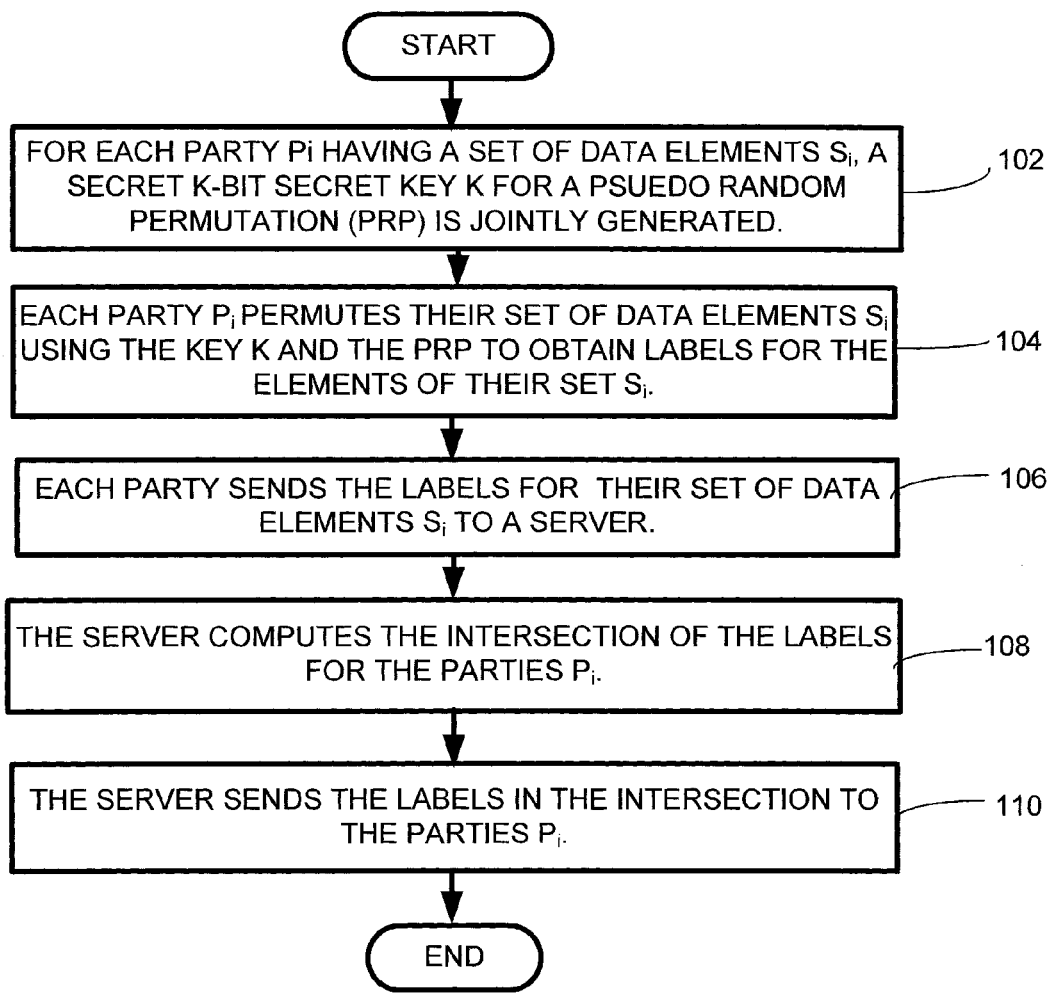
FIG. 1 depicts a flow diagram of a server-aided private set intersection protocol where there is no data transfer between the parties.

In the following description of the server-aided private set intersection with data transfer technique, reference is made to the accompanying drawings, which form a part thereof, and which show by way of illustration examples by which the server-aided private set intersection with data transfer technique described herein may be practiced. It is to be understood that other embodiments may be utilized and structural changes may be made without departing from the scope of the claimed subject matter.

1.0 Server-Aided Private Set Intersection with Data Transfer Technique

The following sections provide an introduction, an overview of multi-party computation, an overview of the notation used in this description, a description of server-aided private set intersection without data transfer, as well as exemplary embodiments of the server-aided private set intersection with data transfer technique described herein. An exemplary data flow diagram and exemplary scenarios for practicing the technique are also described.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Introduction

In the problem of private set intersection (PSI), two parties want to learn the intersection of their sets without revealing to each other any information about their sets beyond the intersection. PSI is a fundamental problem in security and privacy that comes up in many different contexts. Consider, for example, the case of two or more institutions that wish to obtain a list of common customers for data-mining purposes; or a government agency that wants to learn whether anyone on its no-fly list is on a flight's passenger list. PSI has found applications in a wide range of settings such as genomic computation, location-based services, and collaborative botnet detection.

1.1.1 Secure Multi-Party Computation.

PSI is a special case of the more general problem of secure multi-party computation (MPC). In this problem, each party holds its own private input and the goal is to collectively compute a joint function of the participants' inputs without leaking additional information and while guaranteeing correctness of the output. The design and implementation of practical MPC protocols has been an active area of research over past decade with numerous efforts to improve and optimize software implementations and to develop new frameworks. A large body of work, therefore, has focused on the design and implementation of efficient special-purpose PSI protocols.

1.1.2 Limitations of MPC.

As the trend towards larger and larger databases continues, governments and private organizations often manage massive databases that store billions of records. Therefore, for any PSI (and MPC in general) solution to be of practical interest in such settings, it needs to efficiently process sets with tens or hundreds of millions of records.

1.1.3 Server-Aided MPC.

A promising approach to address multi-party computation is server-aided or cloud-assisted MPC. In this variant of MPC, the standard setting is augmented with a small set of servers that have no inputs to the computation and that receive no output but that make their computational resources available to the parties.

1.1.4 Preliminaries and Notation.

This section provides various preliminaries and notation which are useful in understanding the following description of the server-aided private set intersection technique described herein.

Throughout this description, parties to a described protocol that are not the server or untrusted third party may be referred to as clients. The terms the third party, untrusted third party and server may also be used interchangeably.

The protocols described herein are single-round protocols and have roughly the following structure. First the clients process their input sets to generate a set of labels T, which they will send to the server or third party. The server then performs an intersection on the sets it receives and returns the results. For the protocols secure against a malicious or untrusted server, the clients then perform some local checks and extract the intersection from the server's message. For the purpose of this description a simplified notion of non-collusion is used wherein two parties $P_1$ and $P_2$ are considered to not collude if they are not simultaneously corrupted by the adversary (e.g., either $P_1$ is malicious or $P_2$ is, but not both).

In some embodiments of the technique, the server is treated in a conservative manner as untrustworthy (meaning, for instance, that the server cannot be trusted to maintain the confidentiality of information provided to the server). However, in some scenarios, it will be assumed that the server does not collude with any participant module to circumvent the security provisions described herein. Further, in some scenarios, it will be assumed that the parties to the joint computation are semi-honest entities at worst. This means that the entities can be expected to follow a prescribed security protocol. But the entities may try to leverage the information that they discover in the course of this protocol to uncover additional information (to which they are not entitled).

A private-key encryption scheme, such as the one described herein, is a set of three polynomial-time algorithms (Gen, Enc, Dec) that work as follows. Gen is a probabilistic algorithm that takes a security parameter k in unary and returns a secret key K. Enc is a probabilistic algorithm that take a key K and an n-bit message m and returns ciphertext C. Dec is a deterministic algorithm that takes key K and a ciphertext c and returns m if K was the key under which c was produced.

In all the protocols described below, k denotes the computational security parameter (i.e., the key length for a Pseudo-Random Permutation (PRP)) while s denotes a statistical security parameter. For $\lambda \geq 1$, the set $S^\lambda$ is defined as $$S^\lambda = \{x\|1, \ldots, x\|\lambda : x \in S\}$$

and $(S^\lambda)^{-\pi} = S$. If $F: U \to V$ is a function, the S-evaluation of F is the set $F(S) = \{F(s) : s \in S\}$. $F^{-1}$ is denoted as the inverse of F where $F^{-1}(F(S)) = S$. If $\pi: [|S|] \to [|S|]$ is a permutation, then the set $\pi(S)$ is the set that results from permuting the elements of S according to $\pi$ (assuming a natural ordering of the elements). In other words:

$$\pi(S) = \{x_{\pi(i)} : x_i \in S\}.$$

The union and set difference of two sets $S_1$ and $S_2$ is denoted as $S_1 + S_2$ and $S_1 - S_2$, respectively.

1.2 Semi-Honest Server-Aided PSI without Data Transfer

By way of background, and before describing the server-aided private set intersection with data transfer technique, a server-aided private-set intersection without data transfer protocol for a semi-honest server or any collusion of malicious parties is first described. The protocol is shown in Table 1 and described in FIG. 1.

Referring to FIG. 1, let $S_i$ be the set of party $P_i$. The parties start by jointly generating a secret k-bit key K for a Pseudo-Random Permutation (PRP) F, as shown in block 102. Each party randomly permutes the set $F_K(S_i)$ which consists of labels computed by evaluating the PRP over the elements of the party's appropriate set (as shown in block 104), and sends the permuted set to the server (as shown in block 106). The server then simply computes and returns the intersection of the labels $F_K(S_1)$ through $F_K(S_n)$ (see blocks 108, 110). Each party can then know which elements they have in common with the other parties.

Intuitively, the security of the protocol follows from the fact that the parties never receive any messages from each other, and their only possible malicious behavior is to change their own PRP labels which simply translates to changing their input set. The semi-honest server only receives labels which due to the pseudo-randomness of the PRP reveal no information about the set elements.

TABLE 1

A Server-Aided PSI Protocol with a Semi-honest Server

Setup and inputs: Let $F:\{0,1\}^k \times U \to \{0,1\}^{=k}$ be a PRP. Each party $P_i$ has a set $S_i \subseteq U$ as input while the server has no input:
1. $P_1$ samples a random k-bit key K and sends it to $P_i$ for i ∈ [2,n];
2. Each party $P_i$ for i ∈ [n] sends $T_i = \pi_i(F_K(S_i))$ to the server, where $\pi_i$ is a random permutation;
3. The server computes $I = \cap_{i=1}^n T_i$ and returns it to all the parties;
4. Each party $P_i$ outputs $F_K^{-1}(I)$.

The protocol described in Table 1 is secure in the presence (1) a semi-honest server and honest parties or (2) a honest server and any collusion of malicious parties.

Each $P_i$ invokes the PRP, $|S_i|$ times, while the server (in one embodiment) only performs a "plaintext" set intersection and no cryptographic operations. However, the technique can use any of the existing algorithms for set intersection. In one embodiment of the technique a folklore hash table insertion/lookup which runs in nearly linear time is used.

The protocol can be executed asynchronously where each party connects at a different time to submit his message to the server and later to obtain the output.

1.3 Semi-Honest PSI with Data Transfer

In many practical applications of PSI, one of the parties also wishes to transfer some information related to the elements in the intersection. More precisely, consider a scenario where $P_1$ has, in addition to its set $S_1$, a database db that associates to each element x of $S_1$ some data which is denoted as db(x). In such a scenario, $P_1$ may wish to transfer the set {db(x): x∈$S_1 \cap S_2$} to $P_2$, where $S_2$ is the set of $P_2$. While the PSI protocol described above is not sufficient for this scenario, it can be used as a building block in a more complex protocol to achieve such a data transfer.

Figure 2:
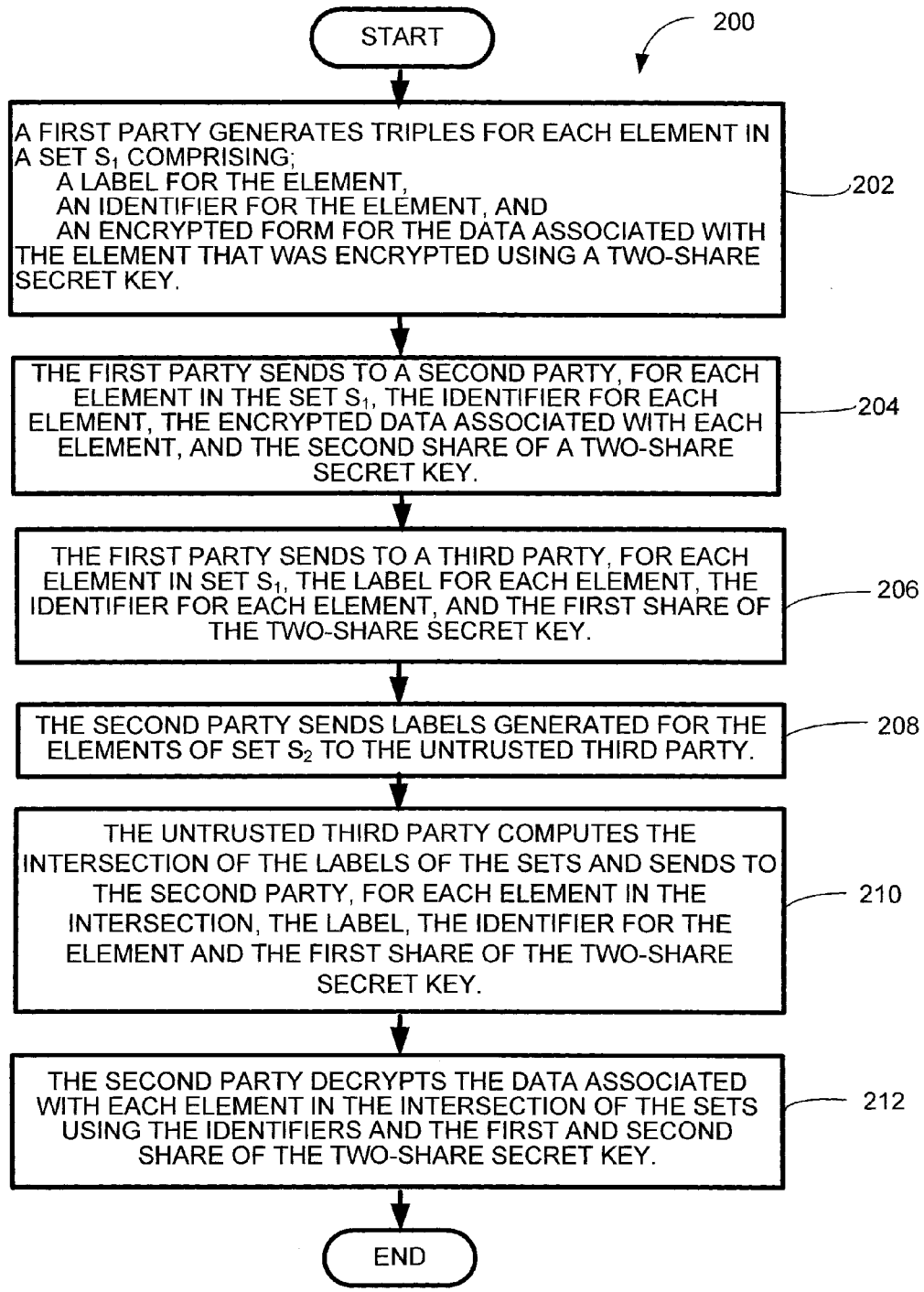
FIG. 2 depicts a flow diagram of an exemplary embodiment of the server-aided private set intersection protocol with data transfer described herein.

FIG. 2 describes a computer-implemented process 200 for creating a protocol for server-aided PSI with data transfer according to the technique. The process transfers some information associated with elements of data in the intersection of two data sets held by two parties without revealing their data set.

As shown in block 202, a first party generates a set of triples for each element in set $S_1$ comprising: a label for the element, an identifier for the element, and an encrypted form for the data associated with the element that was encrypted using a two-share secret key. The labels for each element in $S_1$ are generated using a shared key and a PRP.

As shown in block 204, the first party sends to the second party, for each element in the set $S_1$, the identifier for each element, the encrypted data associated with each element and the second share of the two-share secret key. Additionally, the first party sends to a third party, for each element in set $S_1$, the label for each element, the identifier for the data associated with each element, and the first share of the two-share secret key, as shown in block 206. The second party also sends labels generated for the elements of set $S_2$ to the third party (block 208). The labels for the elements of the set $S_2$ are generated using the same shared key and PRP that the first party used.

Once the third party receives the aforementioned data from the first and second parties, the third party computes the intersection of the labels of the sets and sends to the second party, for each element in the intersection, the label, the identifier associated with the element and the first share of the two-share secret key, as shown in block 210.

The second party can then decrypt the data associated with each element in the intersection of the sets using the labels, the identifiers and the first and second share of the two-share secret key, as shown in block 212. This can be done by XORing the shares to recover the key and then using the key to decrypt the data.

Table 2 depicts a two-party PSI protocol with data transfer that is secure against a semi-honest server and semi-honest $P_1$ and $P_2$. This protocol is described in greater detail with respect to FIG. 3.

TABLE 2

A two-party PSI protocol with data transfer that is secure against a semi-honest parties Setup and inputs: Let $F:\{0,1\}^k \times U \to \{0,1\}^{=k}$ be a PRP. Party $P_1$ has sets $S_1 \subset U$ and db $\subseteq \{0,1\}^*$ as inputs and $P_2$ has a set $S_2 \subseteq U$ as input. The server has no input.
1. $P_1$ samples three random k-bit keys $K_e$, $K_l$, $K_1$ and sends $K_1$ to $P_2$;
2. For all x ∈ $S_1$, $P_1$ computes:
   (a) $z_{x,1} := F_{K_e}(x \| 1)$ and $z_{x,2} := F_{K_e}(x \| 2)$
   (b) $K_x := z_{x,1} \oplus z_{x,2}$
   (c) $c_x \leftarrow Enc_{K_x}(db(x))$
   (d) $id_x := F_{K_1}(x)$
   (e) $l_x := F_{K_l}(x)$.
3. $P_1$ sends
$$T_1 = \pi_1(\{(id_x, z_{x,1}, l_x)\}_{x \in S_1})$$
to the server and
$$D = \pi_{1'}(\{(id_x, z_{x,2}, c_x)\}_{x \in S_1})$$
to $P_2$, where $\pi_1$ and $\pi_{1'}$ are random permutations;
4. $P_2$ sends $T_2 = \pi_2(F_{K_l}(S_2))$ to the server, where $\pi_2$ is a random permutation;
5. The server sends to $P_2$
$$I = \{(id, z_1): (id, z_1, l) \in T_1 \wedge l \in T_2\};$$
6. $P_2$ outputs
$$P = \{Dec_{z_1 \oplus z_2}(c): (id, z_2, c) \in D \wedge (id, z_1) \in I\}.$$

Figure 3:
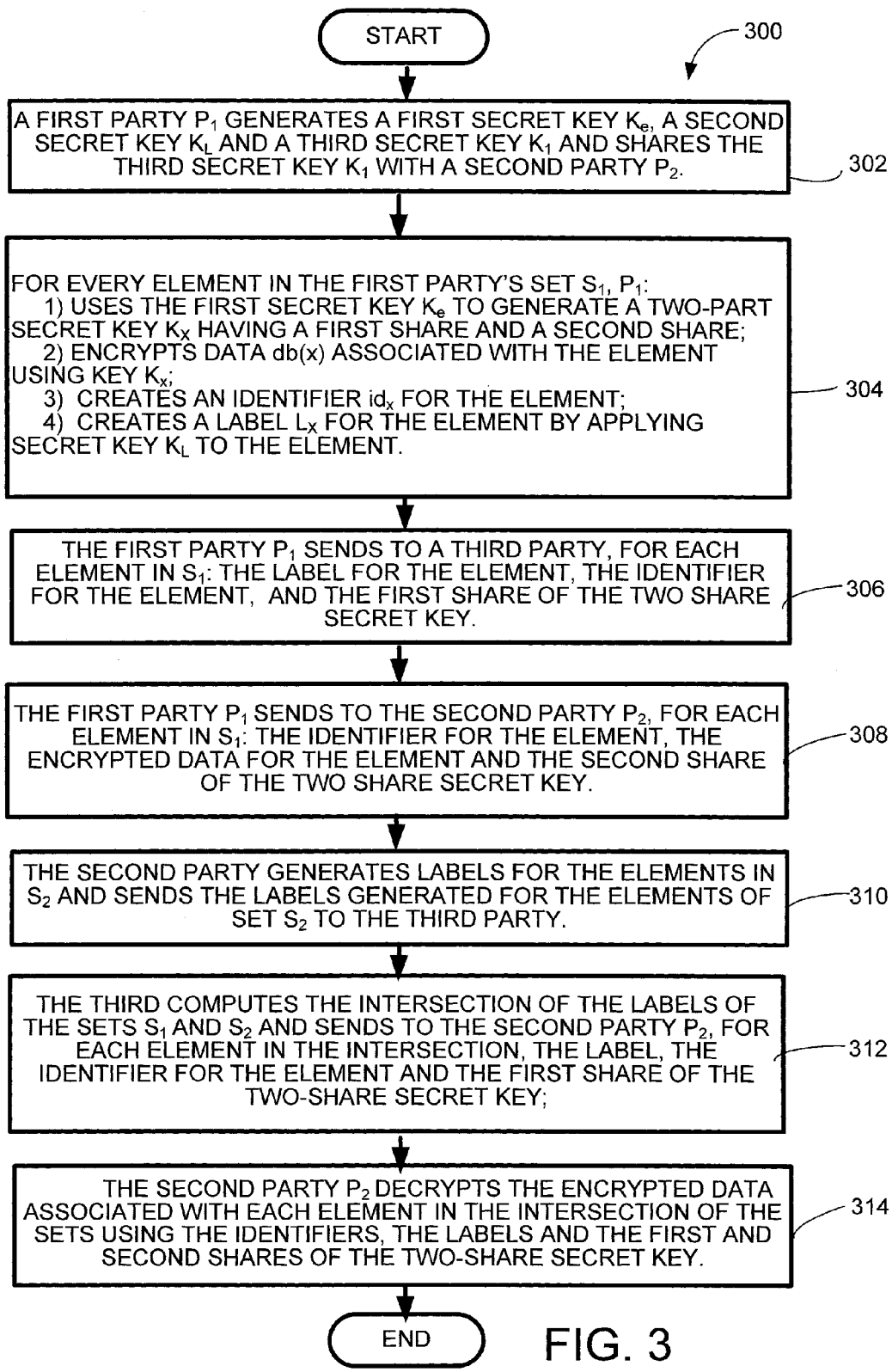
FIG. 3 depicts a flow diagram of another exemplary embodiment of the server-aided private set intersection with data transfer technique described herein.

FIG. 3 depicts another computer-implemented process 300 for transferring some information db(x) associated with the elements x, of data in the intersection of two data sets $S_1$ and $S_2$ held by two parties $P_1$ and $P_2$ using a third party, for example an untrusted third party, without either party $P_1$ or $P_2$ revealing the data in their sets. This computer-implemented process generally relates to the protocol shown in Table 2.

As shown in block 302, the first party $P_1$ generates a first secret key $K_e$, a second secret key $K_l$, and a third secret key $K_1$; and sends the second secret key $K_l$ to the second party $P_2$. Key $K_e$ is used to generate encryption keys for data db(x) associated with each element of set $S_1$, while key $K_l$ is used to generate a label for an element x of a set. Key $K_1$ is used to generate an identifier $id_x$ for each element x of a set.

As shown in block 304, for every element in $P_1$'s set $S_1$:
(1) Using $K_e$, a two-share secret key $K_x$ is generated. This two-share secret key $K_x$ is made up of a first share $z_{x,1}$ and a second share $z_{x,2}$. In one embodiment of the technique this is done by generating the first share $z_{x,1}$ by applying a pseudo-random permutation to element x, concatenated with a first string using key $K_e$. Similarly the second share $z_{x,2}$ is generated by applying a pseudo random permutation to element x, concatenated with a second string using key $K_e$. The key $K_x$ is then generated by performing an XOR operation on first share $z_{x,1}$ and a second share $z_{x,2}$. It is important to note that a first share $z_{x,1}$ and a second share $z_{x,2}$ of a key are generated for each element of $S_1$. Furthermore, other procedures for generating a two-part or even multi-part key could also be used.
(2) The data db(x) for the element is encrypted using key $K_x$ to create encrypted data C(db(x));
(3) An identifier $id_x$ for the element is created by applying a PRP to the element using key $K_1$; and (4) A label $l_x$ for the element is created by applying the secret key $K_l$ and a PRP to the element.

As shown in block 306, the first party $P_1$ sends to the third party a set of triples for each element comprising the identifier $id_x$, the first share of the key $z_{x,1}$ and the label $l_x$. The order of the triples can be randomly shuffled prior to sending them. The first party $P_1$ also sends to $P_2$ a set of triples for each element comprising the identifier $id_x$, the second share of the key $z_{x,1}$ and the encrypted data $C(db(x))$, as shown in block 308. This set of triples can also be randomly shuffled prior to sending them to $P_2$.

The second party $P_2$ generates labels for the elements in $P_2$'s set $S_2$ by permuting the elements using key $K_l$ and a PRP, and sends the labels for each element in set $S_2$ to the untrusted third party (see block 310).

The third party compares the set of labels received from $P_1$ and the set of labels received from $P_2$ to find the intersection I of the permuted labels of $P_1$ and $P_2$, and sends to $P_2$ all triples it received from $P_1$ that have a label inside the intersection (block 312). $P_2$ can then decrypt the triples that $P_2$ received from $P_1$ comprising $P_1$'s encrypted data $C(db(x))$ for the elements that $P_1$ and $P_2$ hold at the intersection of the sets $S_1$ and $S_2$ using both shares of the two-share secret key (block 312).

Each $P_i$ invokes the PRP, $|S_i|$ times, while the server (in one embodiment) only performs a "plaintext" set intersection and no cryptographic operations. However, the technique can use any of the existing algorithms for set intersection. In one embodiment of the technique a folklore hash table insertion/lookup which runs in nearly linear time is used.

The protocol can be executed asynchronously where each party connects at a different time to submit his message to the server and later to obtain the output.

1.4.1 Server-Client Processing

As mentioned previously, although the descriptions of the protocols refer to parties that hold data sets (e.g., first and second parties for example) and a third party that computes the intersection of the data sets, those with ordinary skill in the art will understand that the parties mentioned can operate in a server-client setting. Parties to a described protocol that are not referenced as the server or untrusted third party may hence be referred to as clients. Furthermore, the terms the third party, untrusted third party and server may also be used interchangeably. The following description describes the protocol described in FIG. 3 in terms of client and server side processing. It should be noted that the server may actually be more than one server or computing entity working in a computing cloud. Likewise, although the description refers to first and second clients, many more clients may transfer data about their sets using the server.

1.4.1.1 Client-Side Processing

Figure 4:
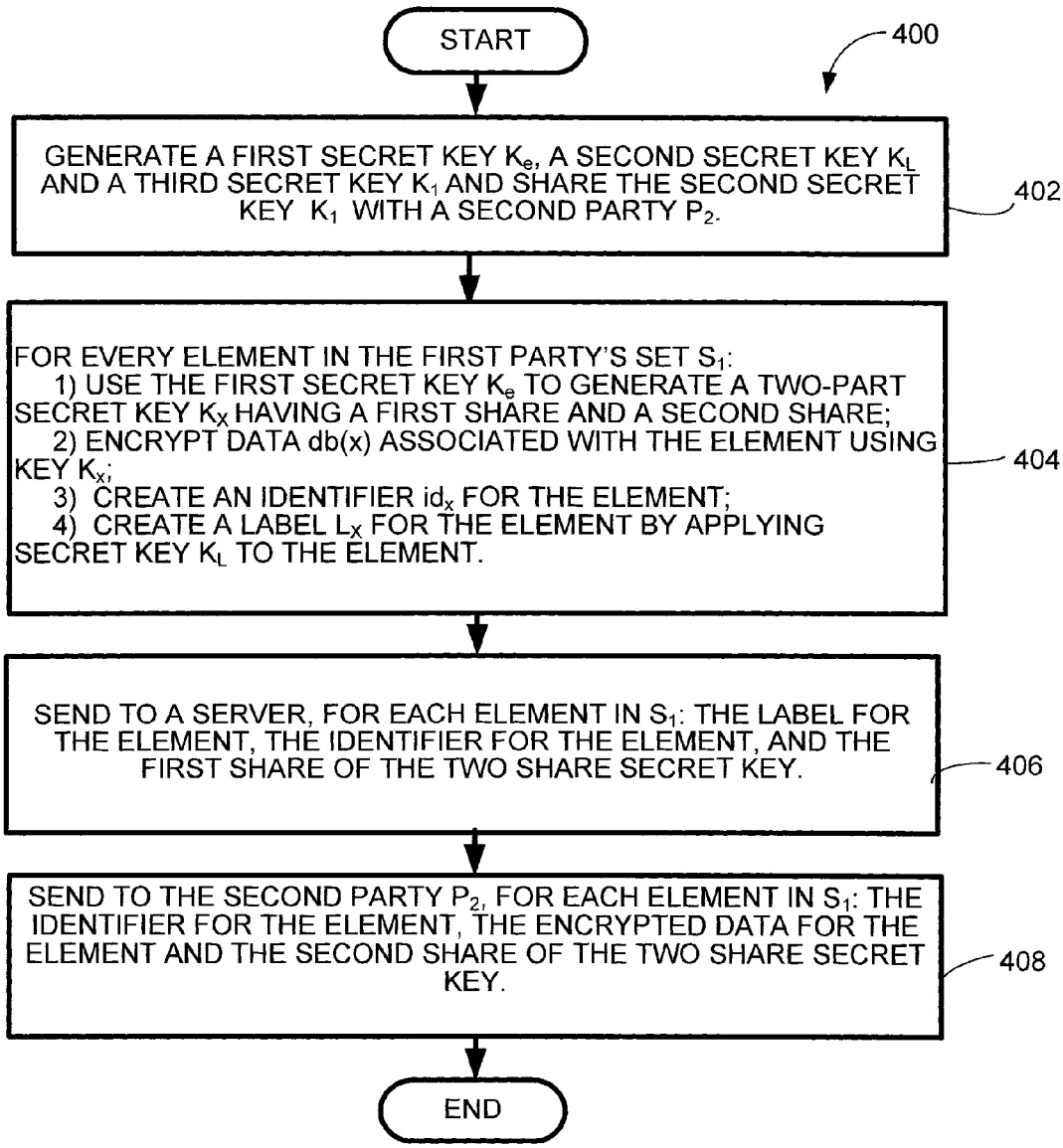
FIG. 4 depicts a flow diagram of the first client's processing of the server-aided private set intersection with data transfer technique described in FIG. 3.

FIG. 4 depicts a computer-implemented process 400 which shows the first client's processing with respect to the protocol described in FIG. 3. The main operations during the client processing step are the application of a PRP to generate labels and the application of a random permutation to randomly shuffle the data before transfer. There are many possibilities for applying a PRP to generate the labels. For example, in one embodiment of the technique the random permutations were instantiated using the Advanced Encryption Standard (AES) (e.g., in counter (CTR) mode, for example, if the elements are larger than 128 bits). Any other block cipher can be used, however.

Referring to FIG. 4, as shown in block 402, the first client $P_1$ generates a first secret key $K_e$, a second secret key $K_l$, and a third secret key $K_1$; and sends the second secret key $K_l$ to the second client $P_2$.

As shown in block 404, for every element in $P_1$'s set $S_1$:
(1) using $K_e$, a two-share secret key $K_x$ is generated. This two-share secret key $K_x$ comprises a first share $z_{x,1}$ and a second share $z_{x,2}$.
(2) The data $db(x)$ for the element is encrypted using key $K_x$ to create encrypted data $C(db(x))$.
(3) An identifier $id_x$ for the data $db(x)$ associated with the element is created; and
(4) A label $l_x$ for the element is created by applying the secret key $K_l$ and a random PRP to the element.

As shown in block 406, the first client $P_1$ sends to the server a set of triples for each element comprising the identifier $id_x$, the first share of the key $z_{x,1}$ and the label $l_x$. The first client $P_1$ sends to $P_2$ a set of triples for each element comprising the identifier $id_x$, the second share of the key $z_{x,1}$ and the encrypted data $C(db(x))$, as shown in block 408. The set of triples in both of these instances are randomly shuffled prior to sending.

Figure 5:
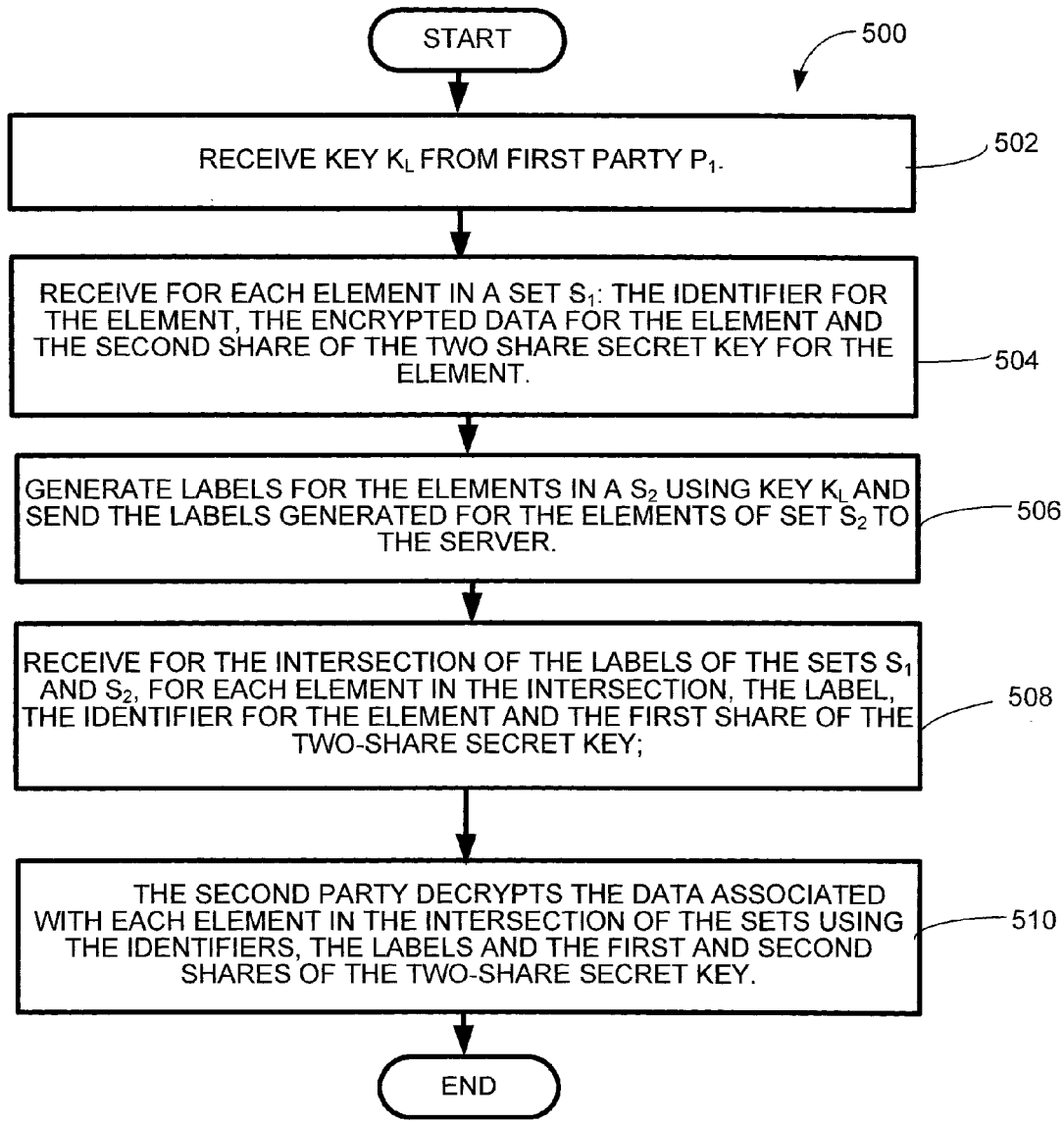
FIG. 5 depicts a flow diagram of the second client's processing of the server-aided private set intersection with data transfer technique described in FIG. 3.

FIG. 5 provides a flow diagram of a computer-implemented process 500 that depicts only the second client's processing of the protocol discussed in FIG. 3. As shown in block 502, the second client $P_2$ receives the secret key $K_l$. Client $P_2$ also receives a set of triples for each element comprising the identifier $id_x$, the second share of the key $z_{x,1}$ and the encrypted data $C(db(x))$, as shown in block 504. The second client $P_2$ generates labels for the elements in $P_2$'s set $S_2$ by permuting the elements using key $K_l$ and a PRP, and sends the labels for each element in set $S_2$ to the server, as shown in block 506. $P_2$ receives all triples of $P_1$ that have a label inside the intersection (block 508). $P_2$ can then decrypt the triples that $P_2$ received from $P_1$ comprising $P_1$'s encrypted data $C(db(x))$ for the elements that $P_1$ and $P_2$ hold at the intersection of the sets $S_1$ and $S_2$ using both shares of the two-share secret key (block 510).

1.4.1.2 Server-Side Processing

Figure 6:
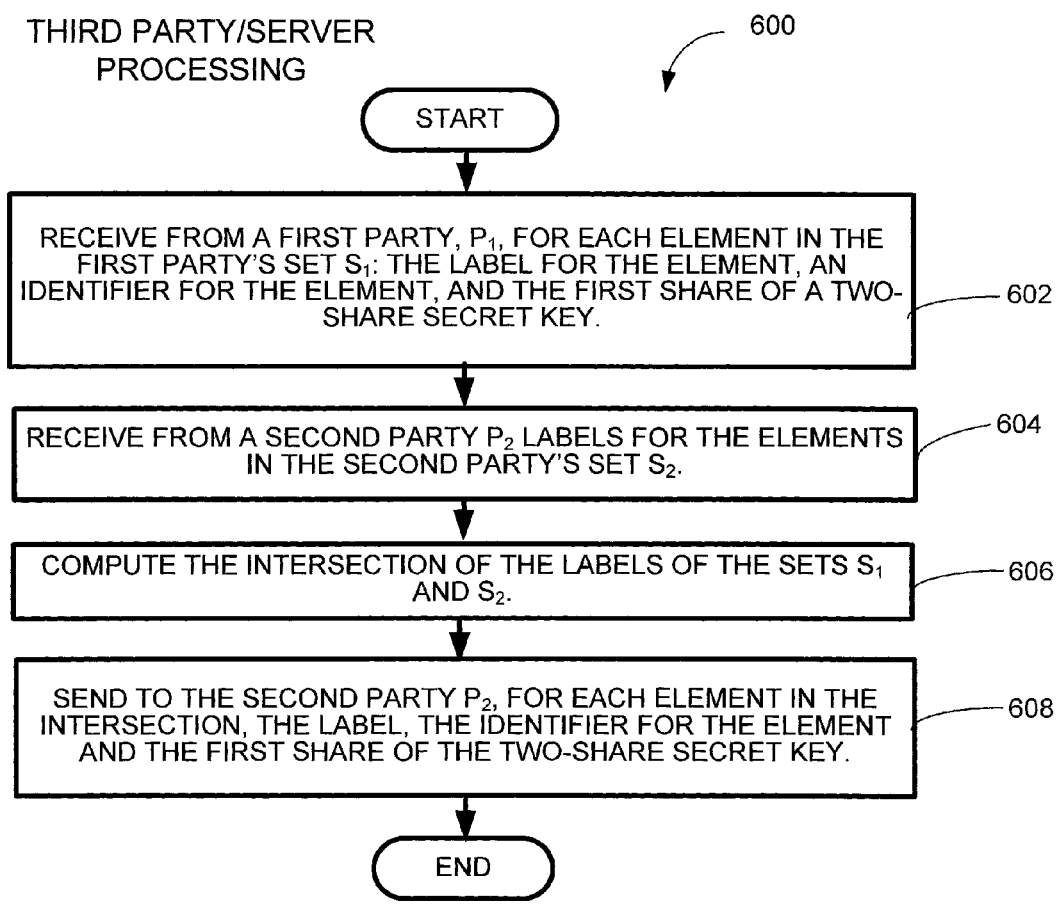
FIG. 6 depicts a flow diagram of the third party/server's processing of the server-aided private set intersection with data transfer technique described in FIG. 3.

FIG. 6 provides a flow chart that depicts only the server (e.g., third party) processing 600 shown in FIG. 3. One of the functions of the server is to compute the intersection of the parties' sets using the labels. In one embodiment of the technique, a simple text intersection on the labels is performed in order to determine which data elements the clients have in common. This involves no cryptographic operations on the part of the server (e.g., untrusted third party). In another embodiment of the technique, the trivial pair-wise comparison approach to compute set intersection has a quadratic complexity and does not scale to large sets. Hence, in one embodiment of the technique, a folklore set intersection algorithm based on hash tables was implemented. In this embodiment the server hashes the elements of the first set into a hash table, and then tries to lookup the elements of the second set in the same table. Any element with a successful lookup is added to the intersection. The server then outputs a Boolean vector indicating which elements of the second set are in the intersection and which are not.

Referring back to FIG. 6, as shown in block 602, the server receives from the first client $P_1$ a set of triples for each element comprising the identifier $id_x$, the first share of the key $z_{x,1}$ and the label $l_x$. The server receives from the second party $P_2$ the labels for each element in set $S_2$ (see block 604).

The server compares the set of labels received from $P_1$ and the set of labels received from $P_2$ to find the intersection I of the permuted labels of $P_1$ and $P_2$ (block 606) and sends to $P_2$ all triples it received from $P_1$ that have a label inside the intersection (block 608). As discussed above, the intersection of the labels can be found in a variety of ways, such as, for example, by computing a plain text intersection on the labels.

1.5 Exemplary Architecture for Practicing the Technique

Exemplary processes for practicing the technique having been provided, the next section provides a discussion of an exemplary architecture for practicing the technique.

Figure 7:
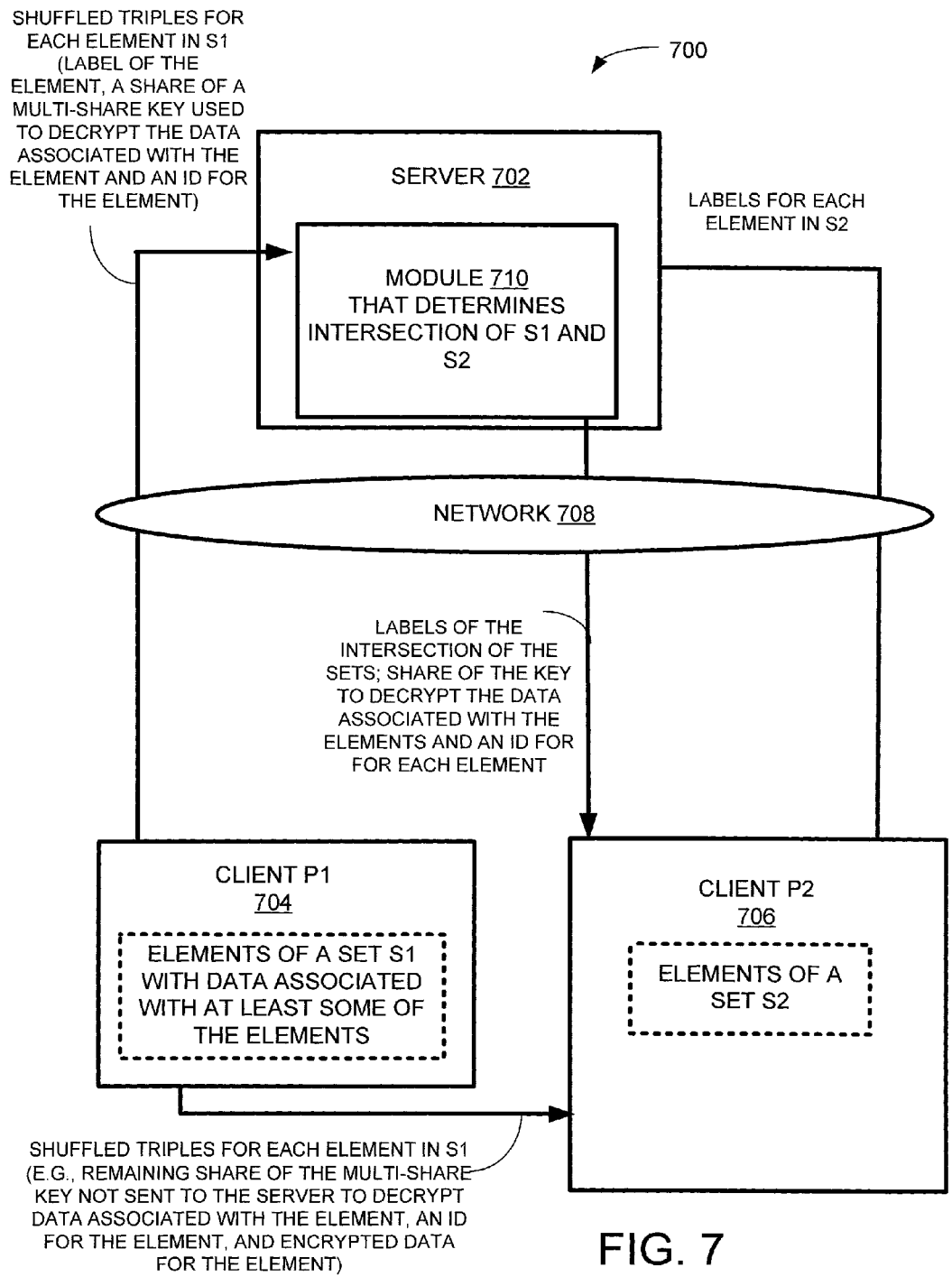
FIG. 7 depicts an architecture for implementing one exemplary embodiment of the server-aided private set intersection with data transfer technique described herein.

FIG. 7 shows an overview of one illustrative system 700 that includes a server module 702 for performing a processing task on behalf of one or more client modules. In this example, FIG. 7 shows two client modules, namely client module $P_1$ 704 and client module $P_2$ 706. However, the server module 702 can provide services to any number of participant modules, including one participant module, or more than two participant modules.

The server module 702 can represent any type of computing functionality. In one case, it corresponds to a computer server that includes processing functionality, input functionality, output functionality, storage functionality, etc. In one scenario, the server module 702 may represent a processing resource in a cloud computing system, such as a data center that provides a cloud computing service. The server module 702 can represent a single resource provided at a single location or a distributed resource that is distributed over plural locations. For example, the server module 702 can correspond to a single physical machine; alternatively, the server module 702 can represent a virtual server module that maps to corresponding underlying computing hardware in any manner.

Each client module 704, 706 can likewise represent any type of functionality that includes processing functionality, input functionality, output functionality, storage functionality, etc. In illustrative concrete examples, any client module can correspond to a stationary personal computing device, a laptop or net book computing device, a personal digital assistant (PDA) computing device, a stylus-type computing device, a mobile phone device, a game console, a set-top box, and so on.

The server module 702 is connected to the client modules $P_1$ 704 and $P_2$ 706 via any type of network 708. The network 708 may represent any type of point-to-point or multi-point coupling mechanism. In one implementation, the network 708 can correspond to a wide area network (e.g., the Internet), a local area network, or combination thereof. The network 708 can include any combination of wireless links, wired links, routers, gateways, etc., as governed by any protocol or combination of protocols. The server module 702 can represent a remote or local resource in relation to any of the participant modules.

In one implementation of the technique, using the architecture 700 shown in FIG. 7, each of the clients 704, 706 apply a shared pseudo random permutation (PRP) to the elements of their data sets using a shared secret key to create labels of the elements of their set and send these labels to the server 702. The first client 704 further generates: an identifier for each of the elements of the first party's set; a multi-share secret key for each of the elements of the first party's set (which could be, for example, a two-share key); and encrypted data associated with each of the elements of the first client's set using the multi-share secret key. The first client sends the encrypted data for all the elements in the first client's set to the other parties, along with a portion of the multi-share secret key, and the identifier for each element of the first client's set. The first client sends the server the remaining portions of the multi-share key and the identifiers for each element. Each client 704, 706 receives for each of the elements in the intersection, the labels for the intersection of the data elements, the identifiers, and the remaining portions of the multi-share key from the server 702. Each client 704, 706 can then decrypt the encrypted associated data for each of the elements in the intersection of the sets using the labels, the identifiers and all portions of the multi-share key for each element.

1.5 Exemplary Data Flow Diagram for Practicing the Technique

Figure 8:
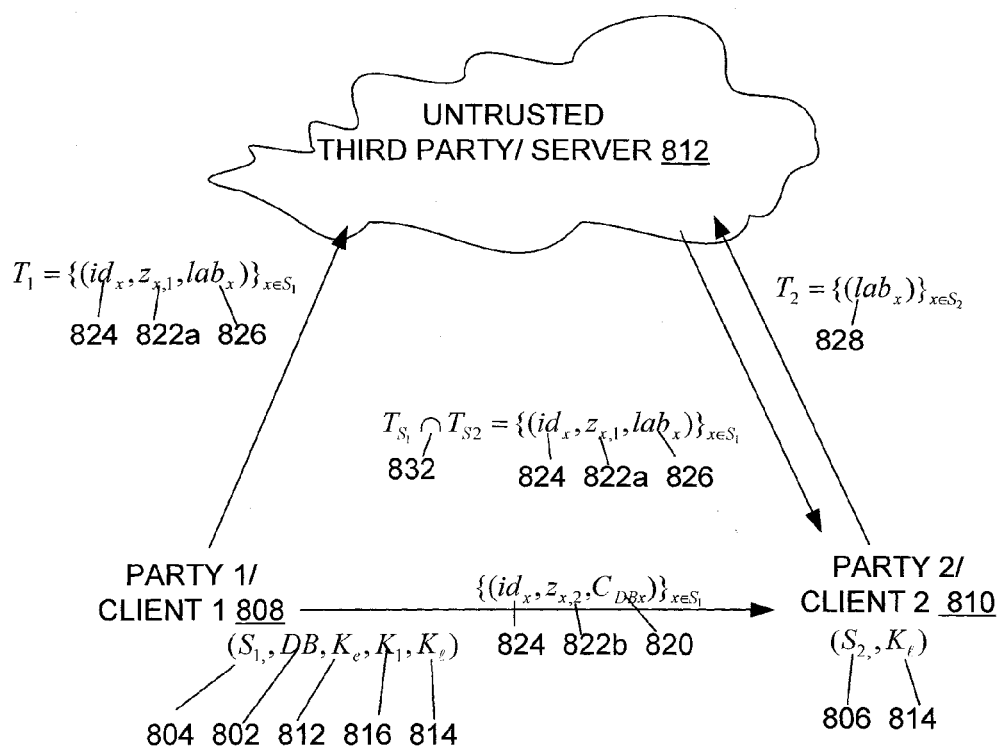
FIG. 8 depicts a data flow diagram for implementing one exemplary embodiment of the server-aided private set intersection with data transfer technique described herein.

FIG. 8 depicts a data flow diagram 800 for transferring some information db(x) 802 associated with the elements of data in the intersection of two data sets $S_1$ 804 and $S_2$ 806 held by two parties $P_1$ 808 and $P_2$ 810 using an untrusted third party 812, without either party $P_1$ or $P_2$ revealing the data in their sets. The first party $P_1$ 808 generates a first secret key $K_e$ 812, a second secret key $K_l$ 814, and a third secret key $K_1$ 816 and sends the second secret key $K_l$ 814 to the second party $P_2$ 810. For every element in $P_1$'s set $S_1$: (1) using $K_e$ 812, a two-share secret key $K_x$ is generated. This two-share secret key $K_x$ comprises a first share $z_{x,1}$ 822a and a second share $z_{x,2}$ 822b; (2) the data db(x) 802 for the element is encrypted using key $K_x$ to create encrypted data C(db(x)) 820; (3) an identifier $id_x$ 824 for the element is created; and (4) a label $l_x$ 826 for the element is created by applying the secret key $K_l$ 814 and a PRP to the element. The first party $P_1$ 808 sends to the third party 812 a set of randomly shuffled triples for each element comprising the identifier $id_x$ 824, the first share of the key $z_{x,1}$ 822a and the label $l_x$ 826. The first party $P_1$ 808 sends to $P_2$ 810 a set of triples for each element comprising the identifier $id_x$ 824, the second share of the key $z_{x,1}$ 822b and the encrypted data C(db(x)) 820. The second party $P_2$ 810 generates labels 828 for the elements in $P_2$'s set $S_2$ 806 by permuting the elements using key $K_l$ 814 and a PRP, and sending the labels 828 for each element in set $S_2$ 806 to the untrusted third party 812. The third party 812 compares the set of labels 826 received from $P_1$ and the set of labels 828 received from $P_2$ 810 to find the intersection 1832 of the permuted labels of $P_1$ and $P_2$, sending to $P_2$ 810 all triples it received from $P_1$ 808 that have a label inside the intersection I 832. $P_2$ 810 can then decrypt the triples that $P_2$ received from $P_1$ 808 comprising $P_1$'s encrypted data C(db(x)) 820 for the elements that $P_1$ and $P_2$ hold at the intersection 1832 of the sets $S_1$ and $S_2$.

2.0 Exemplary Applications

The server-aided private set intersection with data transfer technique can applied to many real world applications, such as, for example, regarding patients' medical data transfer, verification that passengers on a flight are not on a no-fly list, or the transfer of some, but not all, user data for on-line applications. These applications are described in brief below, but there are many, many other applications that can gainfully employ the server-aided private set intersection with data transfer technique.

2.1 Transfer of Medical Data

There are many scenarios where one hospital may not want to divulge the details about individual patient records to either another hospital or a server. For example, in the case where two hospitals have treated some of the same patients, it may be desirable for one hospital to transfer patient data about patients they have both treated from one hospital to another, while it would not be desirable to transfer data about all patients. In this case, the server-aided private set intersection with data transfer technique can be used to transfer patient data about patients both hospitals have treated in order for each hospital to have a complete record of these patients' medical histories.

2.2 Determination of Scheduled Passengers being on a No-Fly List

There are also many scenarios where an airline might not want to divulge the details about travelers on their flights to a government agency or to another country. For example, an airline might not want to divulge their entire passenger list to a government agency or a foreign country in order for the government agency or the foreign country to determine if any of the passengers are on a do-not-fly list. In this case, the server-aided private set intersection with data transfer technique can be used to determine which scheduled passengers on a flight are on the do-not-fly list without revealing data about the other scheduled passengers.

2.3 Sharing of User Data for On-Line or Cloud Applications

There are also many scenarios where one provider of an on-line service or application, for example a gaming service or application, might want to share information about users that the on-line service/application has in common with other on-line applications or services. In this case, it probably would not want to provide information about all of its users. In this case, the server-aided private set intersection with data transfer technique can be used to provide information about users the two on-line services/applications have in common, without revealing data about other users.

Figure 9:
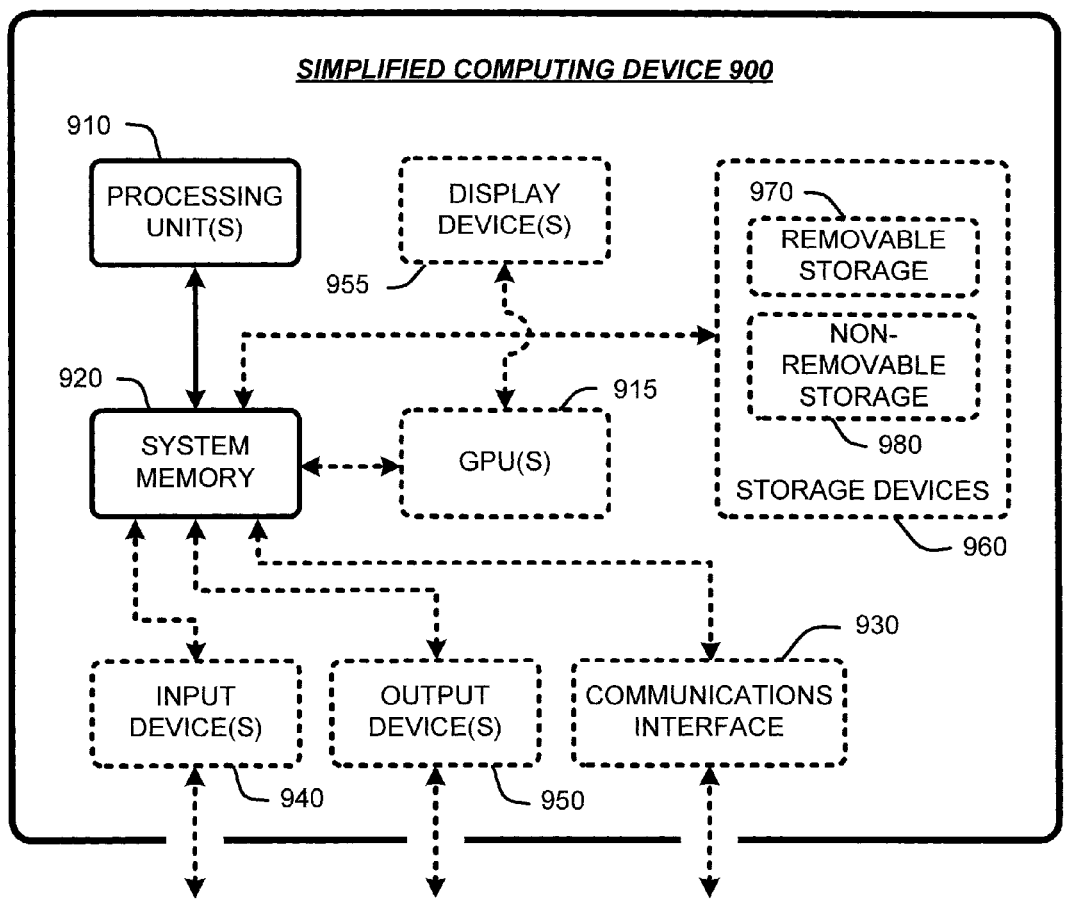
FIG. 9 is a schematic of an exemplary computing environment which can be used to practice the server-aided private set intersection with data transfer technique.

3.0 Exemplary Operating Environment:

The server-aided private set intersection with data transfer technique described herein is operational within numerous types of general purpose or special purpose computing system environments or configurations. FIG. 9 illustrates a simplified example of a general-purpose computer system on which various embodiments and elements of the server-aided private set intersection with data transfer technique, as described herein, may be implemented. It should be noted that any boxes that are represented by broken or dashed lines in FIG. 9 represent alternate embodiments of the simplified computing device, and that any or all of these alternate embodiments, as described below, may be used in combination with other alternate embodiments that are described throughout this document.

For example, FIG. 9 shows a general system diagram showing a simplified computing device 900. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the server-aided private set intersection with data transfer technique, the device should have a sufficient computational capability and system memory to enable basic computational operations. In particular, as illustrated by FIG. 9, the computational capability is generally illustrated by one or more processing unit(s) 910, and may also include one or more GPUs 915, either or both in communication with system memory 920. Note that that the processing unit(s) 910 of the general computing device may be specialized microprocessors, such as a DSP, a VLIW, or other micro-controller, or can be conventional CPUs having one or more processing cores, including specialized GPU-based cores in a multi-core CPU. When used in special purpose devices such as the server-aided private set intersection with data transfer technique, the computing device can be implemented as an ASIC or FPGA, for example.

In addition, the simplified computing device of FIG. 9 may also include other components, such as, for example, a communications interface 930. The simplified computing device of FIG. 9 may also include one or more conventional computer input devices 940 (e.g., pointing devices, keyboards, audio and speech input devices, video input devices, haptic input devices, devices for receiving wired or wireless data transmissions, etc.). The simplified computing device of FIG. 9 may also include other optional components, such as, for example, one or more conventional computer output devices 950 (e.g., display device(s) 955, audio output devices, video output devices, devices for transmitting wired or wireless data transmissions, etc.). Note that typical communications interfaces 930, input devices 940, output devices 950, and storage devices 960 for general-purpose computers are well known to those skilled in the art, and will not be described in detail herein.

The simplified computing device of FIG. 9 may also include a variety of computer readable media. Computer readable media can be any available media that can be accessed by computer 900 via storage devices 960 and includes both volatile and nonvolatile media that is either removable 970 and/or non-removable 980, for storage of information such as computer-readable or computer-executable instructions, data structures, program modules, or other data. Computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of any of the above should also be included within the scope of communication media.

Further, software, programs, and/or computer program products embodying some or all of the various embodiments of the server-aided private set intersection with data transfer technique described herein, or portions thereof, may be stored, received, transmitted, or read from any desired combination of computer or machine readable media or storage devices and communication media in the form of computer executable instructions or other data structures.

Finally, the server-aided private set intersection with data transfer technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for transferring some information associated with elements of a data set held by a first party to a second party without revealing the data set using a third party, comprising:
    generating secret keys, comprising:
        a first key to generate encryption keys for data associated with each element of a set;
        a second key to generate a label for each element of a set; and
        a third key to generate an identifier for the data associated with each element of a set;
    using the first key to generate a two-share secret key;
    at a third party:
        receiving from a first party, for each element in a set $S_1$:
            a label for each element generated by using the second key, an identifier for the element generated by using the third key, and a first share of the two-share secret key;
        receiving from a second party labels generated for the elements of a set $S_2$;
        computing the intersection of the labels of the sets $S_1$ and $S_2$;
        sending to the second party, for each element in the intersection of the labels: the label, the identifier for the element and first share of the two-share secret key.

2. The computer-implemented process of claim 1 wherein the first party generates triples for each element in set $S_1$ comprising:
    a label for the element,
    an identifier for the element, and
    an encrypted form for the data associated with the element that was encrypted using the two-share secret key.

3. The computer-implemented process of claim 1, wherein the first party sends to the second party, for each element in the set $S_1$: the identifier for each element, the encrypted data associated with each element and the second share of the two-share secret key.

4. The computer-implemented process of claim 1, further comprising:
    the second party decrypting the data associated with each element in the intersection of the sets using the identifiers and the first and a second share of the two-share secret key.

5. The computer-implemented process of claim 1 wherein the first party and the second party generate labels for their set by applying a shared pseudo-random permutation (PRP) to the elements of their data sets using a shared key.

6. The computer-implemented process of claim 1 wherein the first party generates the secret two-share key using another secret key.

7. The computer-implemented process of claim 1, wherein the third party is an untrusted third party.

8. The computer-implemented process of claim 4, wherein the first and second parties are clients and the third party is one or more servers in a computing cloud.

9. The computer-implemented process of claim 1 wherein the third party performs a plain text set intersection on the labels.

10. A computer-implemented process for transferring some information db(x) associated with the elements of data in the intersection of two data sets $S_1$ and $S_2$ held by two parties $P_1$ and $P_2$ using an untrusted third party, without either party $P_1$ or $P_2$ revealing the data in their sets, comprising:
    the first party $P_1$ generating a first secret key $K_e$, a second secret key $K_l$, and a third secret key $K_1$ and sending the second secret key $K_l$ to the second party $P_2$;
    for every element x in $P_1$'s set $S_1$:
        using $K_e$, generating a two-share secret key $K_x$ comprising a first share $z_{x,1}$ and a second share $z_{x,2}$,
        encrypting data db(x) associated with the element using key $K_x$,
        creating an identifier $id_x$ for the element,
        creating a label $l_x$ for the element by applying a pseudo-random permutation to the element using the secret key $K_l$;
    the first party $P_1$ sending to the untrusted third party a set of triples for each element in set $S_1$ comprising: the identifier $id_x$, the first share of the key $z_{x,1}$ and the label $l_x$;
    the first party $P_1$ sending to the second party $P_2$ a set of triples for each element comprising: the identifier $id_x$, the second share of the key $z_{x,1}$ and the encrypted data C(db(x));
    the second party $P_2$ generating labels for the elements in $P_2$'s set $S_2$ by applying a permutation to the elements using key $K_l$, and sending the labels for each element in set $S_2$ to the untrusted third party;
    the untrusted third party comparing the set of labels received from $P_1$ and the set of labels received from $P_2$ to find the intersection of the labels of $P_1$ and $P_2$; and
    the untrusted third party sending to $P_2$ all triples the third party received from $P_1$ that have a label inside the intersection.

11. The computer-implemented process of claim 10, further comprising $P_2$ decrypting $P_1$'s encrypted data C(db(x)) for the elements that $P_1$ and $P_2$ hold in the intersection of the sets $S_1$ and $S_2$.

12. The computer-implemented process of claim 11 wherein $P_2$ decrypts the data C(db(x)) with the second share of the key received from $P_1$ and the first share of the key received from the untrusted third party.

13. The computer-implemented process of claim 10 wherein generating key $K_x$ in two shares using the secret key $K_e$ for each element further comprises:
    generating the first share $z_{x,1}$ by applying a pseudo random permutation to element x, concatenated with a first string using key $K_e$;
    generating the second share $z_{x,2}$ by applying a pseudo-random permutation to element x, concatenated with a second string using key $K_e$; and
    generating $K_x$ by performing an XOR operation on first share $z_{x,1}$ and a second share $z_{x,2}$.

14. The computer implemented process of claim 10 wherein the first, second and third secret keys further comprise:
    a key $K_e$ to generate encryption keys for data db(x) associated with each element of set $S_1$;
    a key $K_l$ to generate a label for an element x of a set; and
    a key $K_1$ to generate an identifier $id_x$ for the data db(x) associated with each element x of a set.

15. The computer-implemented process of claim 10 wherein the triples the first party $P_1$ sends are randomly shuffled prior to sending.

16. A system for providing a server-aided set intersection protocol which allows a client to transfer data associated with elements of the client's set of data to one or more other clients via a server, comprising:

each of the clients applying a shared pseudo random permutation (PRP) to the elements of their data sets using a shared secret key to create labels of the elements of their set and sending these labels to the server;

a first client generating:

an identifier for each of the elements of the first client's set, a multi-share secret key for each of the elements of the first client's set from another secret key;

encrypted data associated with each of the elements of the first client's set, encrypted using the multi-share secret key;

the first client sending the encrypted data for all the elements in the first client's set to the other clients, along with a portion of the multi-share secret key for each element, and the identifier for each element of the first client's set;

the first client sending the server for each element in the first client's set, the label for the element, the remaining portions of the multi-share key for the element and the identifier for the element;

each of the other clients receiving from the server for each of the elements in the intersection of the first party's set with their set, the labels for the intersection of the data elements, the identifiers for each element, and the remaining portions of the multi-share key from the server;

each client decrypting the associated data for each of the elements in the intersection of the sets using the labels, the identifiers and all portions of the multi-share key for each of the elements.

17. The system of claim 16, wherein the server is in a computing cloud.

18. The system of claim 16 wherein the multi-share key is a two-share key.

19. The system of claim 16, wherein more than one client has data associated with the elements in their set and wherein the data is transferred to the other clients using the server.

20. The system of claim 16, wherein the data associated with the elements in the first party's set relates to an on-line gaming application.

* * * * *